(12) United States Patent
Kim et al.

(10) Patent No.: US 7,623,470 B2
(45) Date of Patent: Nov. 24, 2009

(54) METHOD AND APPARATUS FOR ADJUSTING OUTPUT BIT RATE OF VIDEO PACKET

(75) Inventors: Yong-Deok Kim, Seoul (KR);
Young-Hun Joo, Yongin-si (KR);
Han-Sang Kim, Gyeonggi-do (KR)

(73) Assignee: Samsung Electronics Co., Ltd.,
Yeongtong-Gu, Suwon-Si, Gyeonggi-Do (KR)

( * ) Notice: Subject to any disclaimer, the term of this patent is extended or adjusted under 35 U.S.C. 154(b) by 547 days.

(21) Appl. No.: 11/593,905

(22) Filed: Nov. 7, 2006

(65) Prior Publication Data
US 2007/0189183 A1   Aug. 16, 2007

(30) Foreign Application Priority Data
Feb. 10, 2006   (KR) ...................... 10-2006-0013012

(51) Int. Cl.
*H04J 1/16*   (2006.01)
*H04N 5/04*   (2006.01)

(52) U.S. Cl. ....................... 370/252; 370/503
(58) Field of Classification Search ........................ None
See application file for complete search history.

(56) References Cited
U.S. PATENT DOCUMENTS

| | | | | |
|---|---|---|---|---|
| 5,065,408 A | * | 11/1991 | Gillig ......................... | 375/222 |
| 5,276,688 A | * | 1/1994 | Urbansky .................... | 370/465 |
| 5,598,445 A | * | 1/1997 | Castano Pinto et al. ..... | 375/372 |
| 6,961,314 B1 | * | 11/2005 | Quigley et al. .............. | 370/252 |
| 7,113,486 B2 | * | 9/2006 | Schwartz .................... | 370/252 |
| 7,298,762 B2 | * | 11/2007 | Rakib ......................... | 370/468 |
| 2005/0007956 A1 | * | 1/2005 | Nilsson et al. .............. | 370/232 |
| 2006/0007871 A1 | * | 1/2006 | Welin ......................... | 370/252 |

FOREIGN PATENT DOCUMENTS

| | | |
|---|---|---|
| JP | 2005-244517 | 9/2005 |
| KR | 1999-50558 | 7/1999 |
| KR | 2001-33572 | 4/2001 |

\* cited by examiner

*Primary Examiner*—Min Jung
(74) *Attorney, Agent, or Firm*—Cha & Reiter, LLC (57) ABSTRACT

An apparatus for adjusting an output bit rate of a TS packet includes: a TS processing unit for processing the TS packet; an output buffer for buffering and outputting TS packets processed by the TS processing unit; and a bit rate adjustment unit for separating a counting value of packet output time into an integral part and a decimal part by a preset reference cipher according to ticks, generating TS packet output signals for outputting one TS packet stored in the output buffer if a value obtained by performing first counting according to the ticks reaches a value of the integral part, resetting a first count value, and decreasing the first count value by one if a carry occurs in a value obtained by performing second counting for achieving an increment by the value of the stored decimal part whenever the TS packet output signals are generated.

7 Claims, 6 Drawing Sheets

FIG. 1A
(PRIOR ART)

Basic AD 9850 Clock Generator Application

| Data Rate bps | Packets/sec | # of Basic Ticks per packet | Main Tick Register Decimal | Fraction Register (decimal) | Fractional Reg-Hex |
|---|---|---|---|---|---|
| 30080000 | 20000 | 50 | 50 | 0 | 00000 |
| 30080100 | 20000.06649 | 49.99983 | 49 | 0.99983 | 1868F |
| 30285000 | 20136.30319 | 49.66155 | 49 | 0.66155 | 1026B |

FIG.4

| Fraction counter | Carry |
|---|---|
| 0 | 0 |
| 66155 | 0 |
| 132310 | 1 |
| 198465 | 0 |
| 264620 | 1 |
| 330775 | 1 |
| 396930 | 0 |
| 463085 | 1 |
| 529240 | 1 |
| 595395 | 0 |
| 661550 | 1 |
| 727705 | 1 |

METHOD AND APPARATUS FOR ADJUSTING OUTPUT BIT RATE OF VIDEO PACKET

CLAIM OF PRIORITY

This application claims priority to an application entitled "Method And Apparatus For Adjusting Output Bit Rate Of Video Packet," filed in the Korean Intellectual Property Office on Feb. 10, 2006 and assigned Serial No. 2006-13012, the contents of which are hereby incorporated by reference.

BACKGROUND OF THE INVENTION

1. Field of the Invention

The present invention relates to a method and an apparatus for adjusting an output bit rate of a video packet so that a bit rate desired by a user can be efficiently and precisely achieved when Transport Streams (TSs) of a Moving Picture Experts Group (MPEG)-2 system are output by the packet.

2. Description of the Related Art

Recently, digital video data transmission through a broadband communication system, such as a cable TV network or a satellite TV network, has been popularized via satellite/terrestrial/cable transmission media. Generally, compression technology is applied to source video/audio data of digital broadcasting, etc., to service large data quantities. To this end, MPEG compression technology, including an MPEG-1, an MPEG-2, an MPEG-4, etc., is widely applied.

In a transport layer, an MPEG-2 TS is used, which is a standard TS made for MPEG-2 transmission. Herein, a TS may be transmitted at a proper Constant Bit Rate (CBR) or a Variable Bit Rate (VBR).

A conventional method of adjusting an output bit rate of a video packet may include: (1) "Implementation of a New MPEG-2 Transport Stream Processor for Digital Television Broadcasting, IEEE TRANSACTIONS ON BROADCASTING, VOL, 48, NO. 4, DECEMBER 2002"; and (2) "Implementation of MPEG-2 Transport Stream Remultiplexer for DTV Broadcasting, IEEE Transactions on Consumer Electronics, Vol, 48, No. 2, MAY 2002".

Figure 1A:
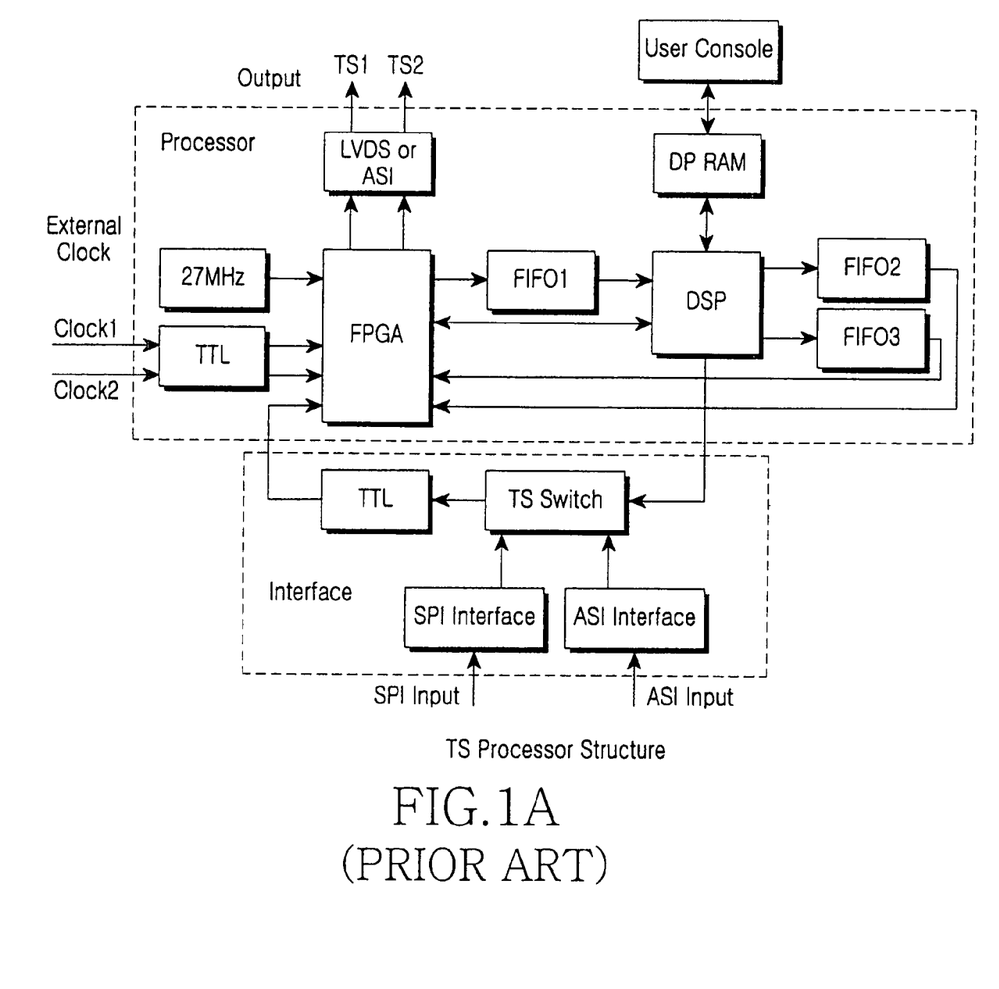
FIGS. 1a and 1b are exemplary views illustrating schemes for adjusting a bit rate of a video packet according to the prior art.
Figure 1B:
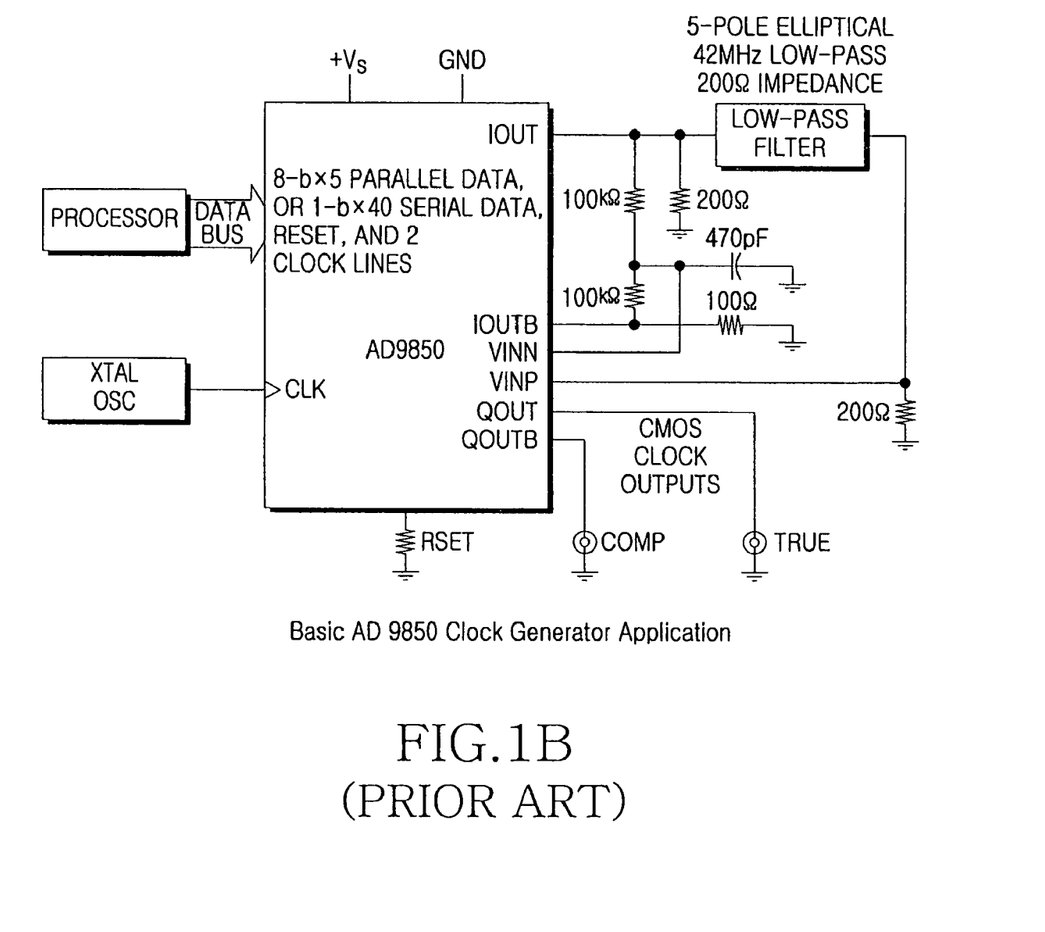

According to technology (1) of the conventional method, it is possible to change the bit rate of output video from 1.5 to 120 Mbps in the transmission of an MPEG-2 TS video packet, but this is determined by external clocks such as two external clocks "Clock 1/Clock 2" as illustrated in FIG. 1a. In such a case, it is necessary to separately install an external variable clock source in order to change a clock, which results in inefficiency. Such a problem also occurs in technology (2) of the conventional method. In technology (2), an output interface clock is generated using a separate Direct Digital Synthesizer (DDS) chip "AD9860" as illustrated in FIG. 1b. Further, it is necessary to provide peripheral circuits including a clock source, such as a crystal oscillator "XTAL OSC" for an output interface, separately from a clock for operating an MPEG-2 TS packet processing logic, a DDS chip for generating a new clock by using the clock source, a low-pass filter, etc. In addition, it is necessary to connect data buses from a processor in order to control the DDS chip, thus the circuit becomes complicated. Moreover, in order to change a clock during an operation, an output interface must be initialized. Therefore, data may be lost.

SUMMARY OF THE INVENTION

Accordingly, the present invention has been made to solve the above-mentioned problems occurring in the prior art and provides additional advantages, by providing a method and an apparatus for precisely adjusting an output bit rate of a video packet in a simple manner, without using separately added external hardware or separate clocks as required in the prior art when video data including MPEG-2 TSs is output.

According to an embodiment of the present, an apparatus for adjusting an output bit rate of a Transport Stream (TS) packet includes: a TS processing unit for processing the TS packet; an output buffer for buffering and outputting TS packets processed by the TS processing unit; and a bit rate adjustment unit for separating a counting value of packet output time based on a bit rate requested by the TS processing unit into an integer part and a decimal part by a preset reference cipher according to ticks, storing the integer part and the decimal part, generating TS packet output signals for outputting one TS packet stored in the output buffer if a value obtained by performing first counting according to the ticks reaches a value of the integer part, resetting a first count value, and decreasing the first count value by one if a carry occurs in a value obtained by performing second counting for achieving an increment by the value of the stored decimal part whenever the TS packet output signals are generated.

According to another embodiment of the present, a method for adjusting an output bit rate of a Transport Stream (TS) packet includes the steps of: separating a counting value of packet output time based on a requested bit rate into an integer part and a decimal part by a preset reference cipher according to ticks, and setting values of main tick and fraction registers; performing a counting operation for increasing a main counter by one every tick; if a count value of the main counter reaches the value of the main tick registers, outputting one TS packet, resetting the main counter, and then performing the counting operation again; and increasing the value of the fraction counter by a value stored in the fraction register whenever the packet is transmitted, and decreasing the value of the main counter by one if a carry occurs in the fraction counter due to overflow.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, an exemplary embodiment according to the present invention will be described with reference to the accompanying drawings. In the following description, many particular items, such as detailed elements, are shown, but these are provided for helping the general understanding of the present invention, and it will be understood by those skilled in the art that these particular items can be modified without departing from the spirit and scope of the present invention.

Figure 2:
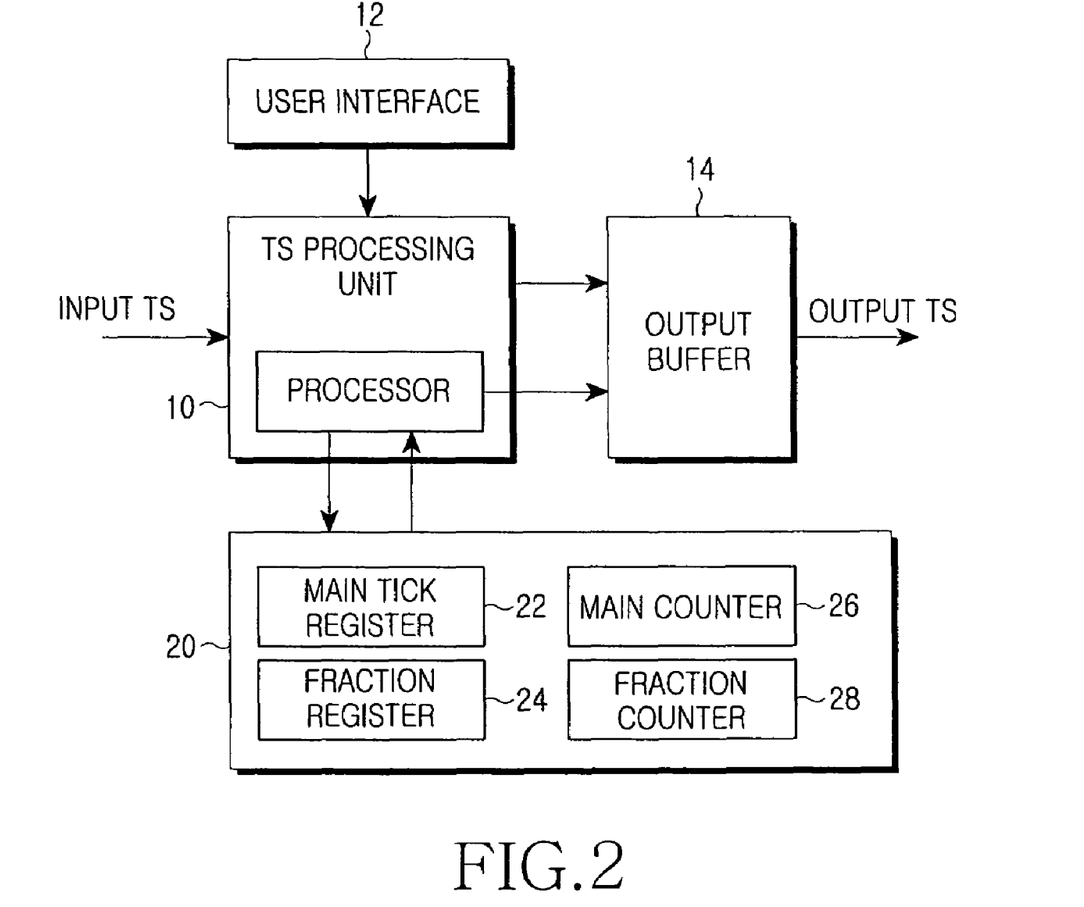
FIG. 2 is a block diagram illustrating the construction of an apparatus for adjusting an output bit rate of a video packet according to one embodiment of the present invention.

FIG. 2 is a block diagram illustrating the construction of an apparatus for adjusting an output bit rate of a video packet according to one embodiment of the present invention. As shown, the inventive apparatus includes a TS processing unit 10 for processing an MPEG-2 TS, a user interface 12 for receiving a desired bit rate from a user, an output buffer 14 for buffering and outputting TS packets processed by the TS processing unit 10, and a bit rate adjustment unit 20.

In operation, the bit rate adjustment unit 20 separates the counting value of packet output time based on a bit rate requested by the TS processing unit 10 into an integer part and a decimal part using a preset reference cipher according to ticks; stores the integer part and the decimal part; generates TS packet output signals for outputting one TS packet stored in the output buffer 14 if a value obtained by performing a first counting according to the ticks reaching the value of the integer part; resets the first count value; and decreases the first count value by one if a carry occurs in a value obtained by performing a second counting for achieving an increment by the value of the stored decimal part whenever the TS packet output signals are generated.

The bit rate adjustment unit 20 may include programmable main tick and fraction registers 22 and 24, which respectively store the integer part and the decimal part separately from each other using the preset reference cipher according to the ticks, and main and fraction counters 26 and 28 for performing the first and second counting, respectively.

Herein, devices and chipsets dealing with an MPEG-2 TS are achieved by hardware because the data rate of the MPEG-2 TS is high and its standard has been previously fixed. In the present invention, the TS processing unit 10 can be applied to a TS processor for processing such an MPEG-2 TS, a splitter, a remultiplexer, a generator, etc. The TS packets processed by such function units (or application programs) are stored in a buffer (e.g. the output buffer 14) prior to output. In order to output these TS packets at a bit rate desired by a user, the present invention additionally includes the bit rate adjustment unit 20 with a relatively simple structure, which has two registers and two counters as described above.

Figure 3:
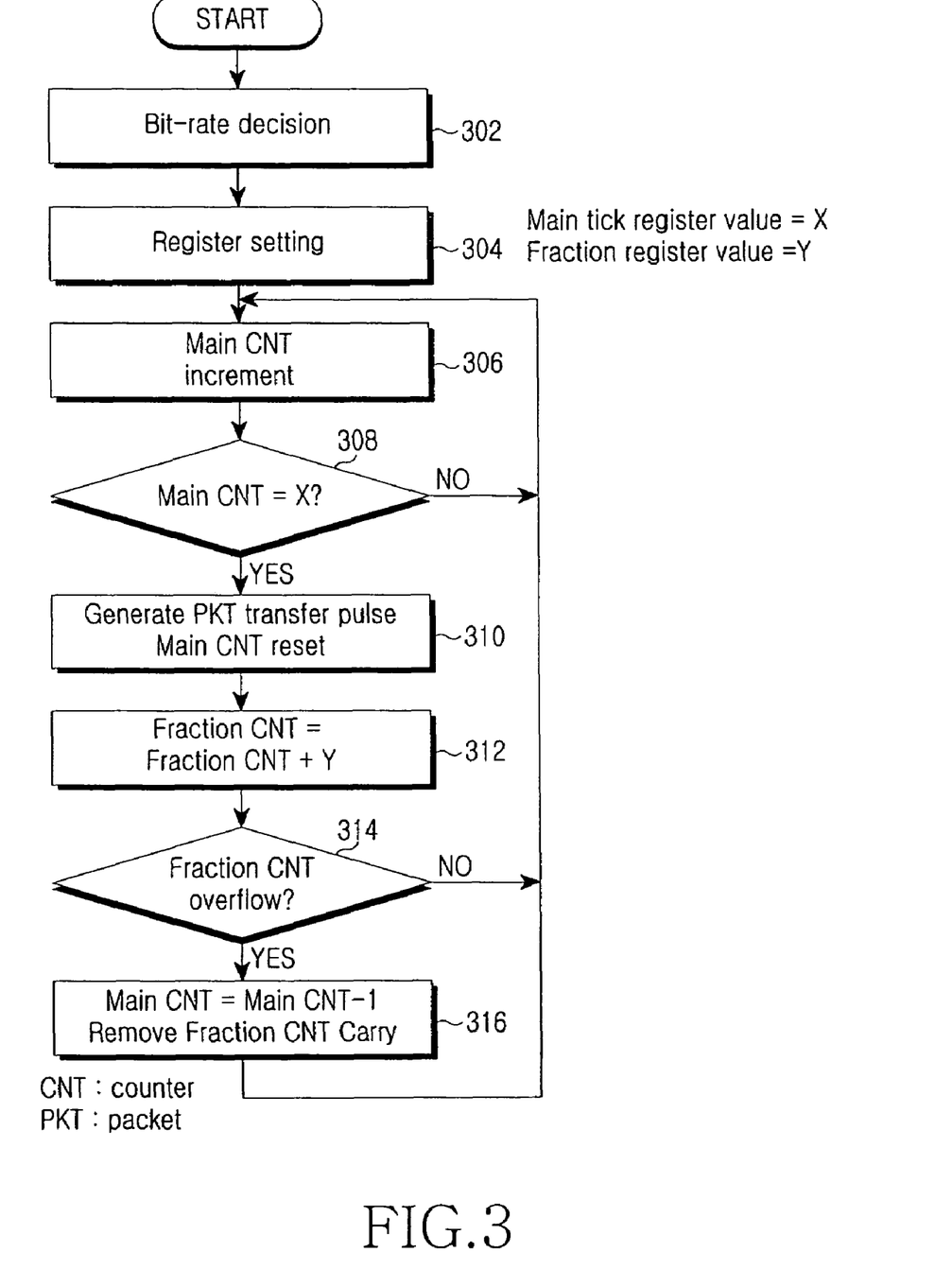
FIG. 3 is a flow diagram illustrating an operation for adjusting the output bit rate of the video packet in FIG. 2.

FIG. 3 is a flow diagram illustrating the operation steps of adjusting the output bit rate of the video packet in FIG. 2. Referring to FIG. 3, if a bit rate desired by a user to output TS packets is input through the user interface 12, the TS processing unit 10 receives the input bit rate in step 302. In step 304, the TS processing unit 10 separates the counting value of the packet output time based on the bit rate into the integer part and the decimal part using the preset reference cipher (e.g. usec) according to the ticks, and sets the values of the main tick and fraction registers 22 and 24. The values of the main tick and fraction registers 22 and 24 may be computed by equation 1 below.

–Main tick register value=Quotient[Packet Size(1504 bits)]/[Basic Time Tick($1 \times 10^{-6}$)]×Data Rate]

–fraction register value={[Packet Size(1504 bits)]/[Basic Time Tick($1 \times 10^{-6}$)×Data Rate]–Quotient [Packet Size(1504 bits)]/[Basic Time Tick($1 \times 10^{-6}$)×Data Rate]}×$10^5$       Equation 1

In equation 1, time required for transmitting one packet is computed in units of usec, and this value is separated such that its integer part is stored in the main tick registers 22 and its decimal part is stored in the fraction register 24.

After setting the respective register values according to the decided bit rate in step 304, the TS processing unit 10 performs a counting operation for increasing the main counter 26 by one every one usec in step 306. In step 308, the TS processing unit 10 determines if the count value of the main counter 26 reaches the previously programmed value of the main tick registers 22. In step 310, the TS processing unit 10 outputs one TS packet, resets the main counter 26, and then performs the counting operation again.

In step 312, the TS processing unit 10 increases the value of the fraction counter 28 by the value, which is stored in the fraction register 24 whenever a packet transmission occurs. That is, the value of the fraction counter 28 increases by the value of the fraction register 24 whenever the packet transmission occurs.

In step 314, the TS processing unit 10 determines if a carry occurs in the fraction counter 28 due to overflow. If the overflow does not occur, the procedure returns to step 306 so as to allow the steps to be repeated. Otherwise, the TS processing unit 10 decreases the value of the main counter 26 by one and resets the carry in step 316. Then, the procedure returns to step 306 so as to allow the steps to be repeated.

In the afore-described operation, overflow conditions of the fraction counter 28 depends on how accurate the calculation is performed in equation 1. For example, if a value is computed down to five decimal places in equation 1, a maximum value storable in the fraction register 24 is 99999. If the value of the fraction counter 28 reaches 99999, overflow occurs.

Figure 4:
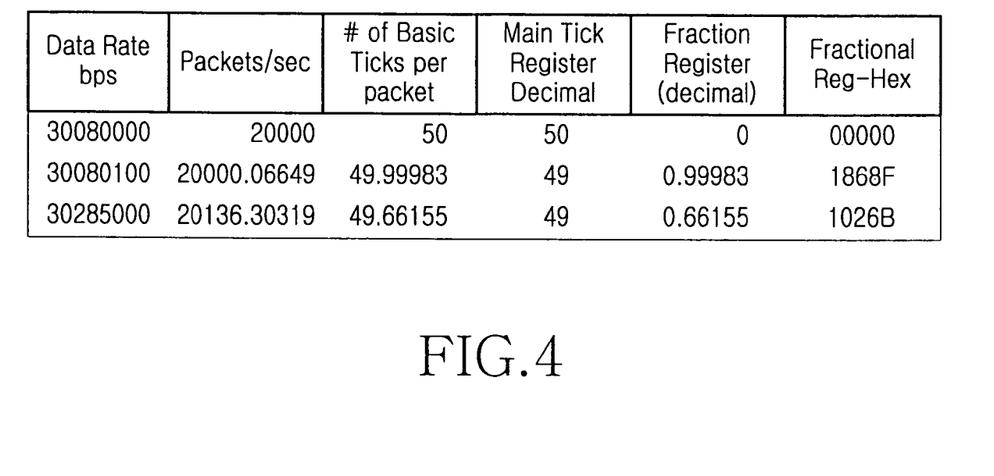
FIG. 4 is an exemplary view illustrating values of main tick and fraction registers for adjustment of the output bit rate of the video packet in FIG. 2.

FIG. 4 is an exemplary view illustrating the values of main tick and fraction registers for adjustment of the output bit rate of the video packet in FIG. 2, which illustrates the values of the main tick and fraction registers 22 and 24 according to data rates. Referring to FIG. 4, when a TS packet is to be output at a speed of 30.08 Mbps, 20,000 packets must be output per second. This implies that time required for outputting one packet is 50 usec. Through equation 1, the main tick registers 22 has a value of 50 and the fraction register 24 has a value of 0. In the example of FIG. 4, when a TS packet is to be output at a speed of 30.285 Mbps, packets of 20136.30319 must be output per second and time required for outputting one packet is 49.66155 usec. Accordingly, it can be understood that the main tick registers 22 has a value of 49 and the fraction register 24 has a value of 66155 (decimal) (hex value is 1026B).

Figure 5:
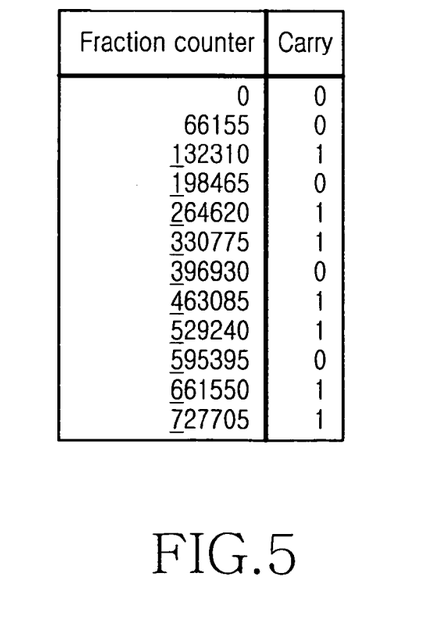
FIG. 5 is an exemplary view illustrating a carry occurrence state in the fraction counter in FIG. 2.

FIG. 5 is an exemplary view illustrating a carry occurrence state in the fraction counter in FIG. 2. For example, FIG. 5 illustrates a carry occurrence state in a case where, when a bit rate is 30.285 Mbps, the value of the fraction counter 28 increases by 66155 (the current value of the fraction register 24) whenever a packet is output by the main counter 26. Herein, if a carry occurs, the value "r" of the main counter 26 decreases due to the carry and an packet transmission interval changes, which results in change in a bit rate.

Figure 6:
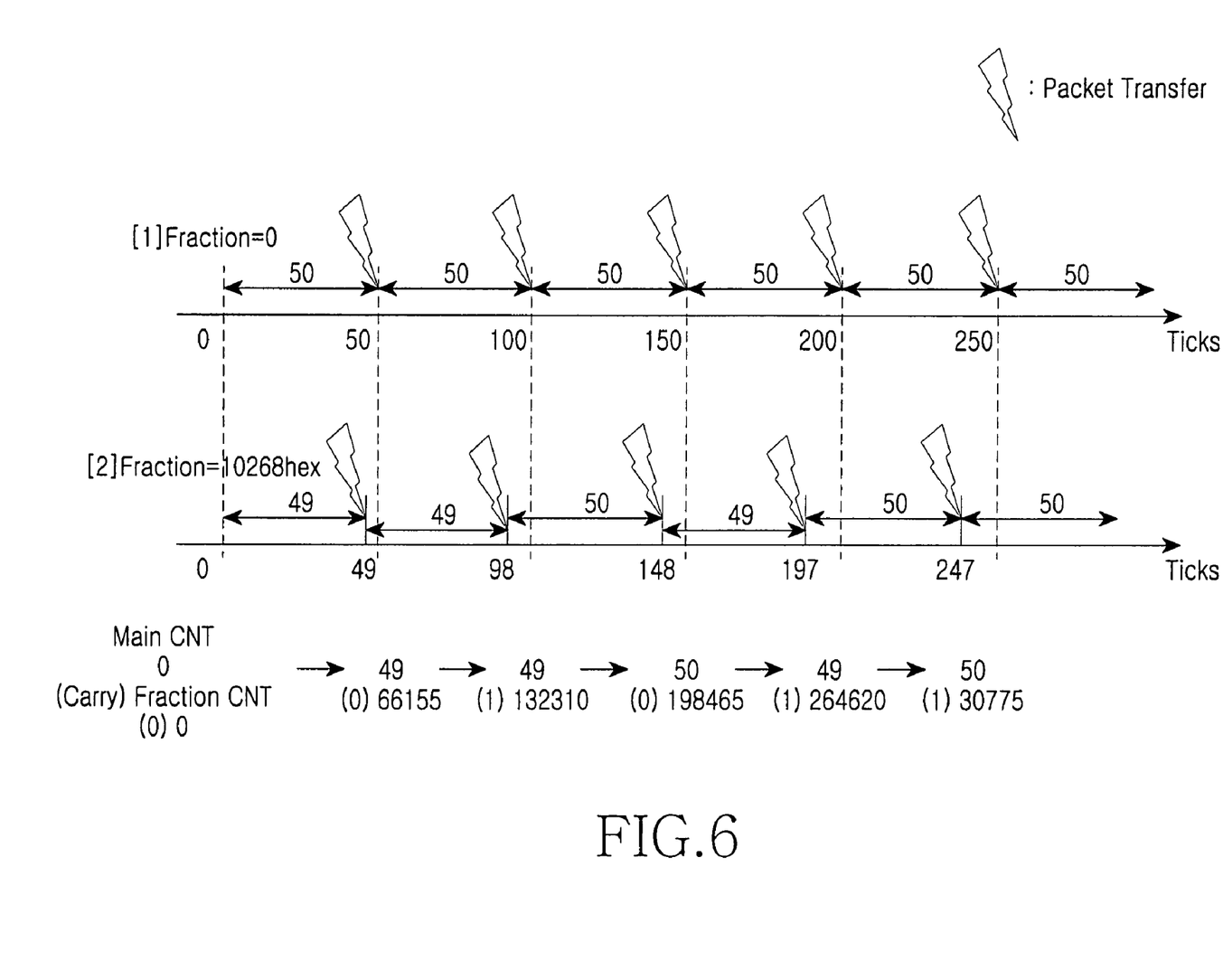
FIG. 6 is an exemplary view of the video packet output timing in FIG. 2.

FIG. 6 is an exemplary view of the video packet output timing of FIG. 2. For example, FIG. 6 (1) illustrates the packet output timing when the main tick registers 22 has a value of 50 and the fraction register 24 has a value of 0, and FIG. 6 (2) illustrates the packet output timing when the main tick registers 22 has a value of 49 and the fraction register 24 has a value of 66155 (decimal) (hex value is 1026B). As illustrated in FIG. 6, FIG. 6 (1) illustrates that a packet is precisely output every 50 ticks, i.e. 50 usec, but FIG. 6 (2) illustrates that a packet is output every 49 or 50 ticks. In FIG. 6 (2), the first packet is generated after 49 ticks by the counting of the main counter 26, thus the fraction counter 28 has a value of 66155. Herein, since a carry has not occurred, the second packet is generated after 49 ticks and thus the fraction counter 28 has a value of 132310. Herein, since a carry has occurred, the count value of the main counter 26 decreases by one, thus the third packet is generated after 50 ticks. Such a process is performed, so that it is possible to precisely control packet output based on a variable bit rate.

In the afore-described operation, when a bit rate is 30.285 Mbps, each packet must be numerically output at a regular interval of 49.66155 usec. However, it is very difficult to achieve such a precise operation, and this precise operation is meaningless when considering a transmission error such as transmission delay. Accordingly, the scheme according to the present invention as described above can satisfy both a permissible transmission error and a requested bit rate.

As described above, the prior art is dependent on a physical clock when controlling a bit rate by controlling the output of an MPEG-2 TS packet. Therefore, a packet is output only at a fixed bit rate, and it is necessary to separately use an external chipset, which can change or program a clock, in order to change a bit rate. However, the present invention can precisely control a bit rate by using a simple counter, etc. For example, in order to achieve 100 bps resolution within the range of 0 to 80 Mbps, the present invention has only to use one register of 16 bits, one counter of 11 bits, one register of 20 bits, and one counter of 21 bits. Consequently, the bit rate adjustment scheme of the present invention enables precise control without great increase in the cost of hardware.

Although a preferred embodiment of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. An apparatus for adjusting an output bit rate of a Transport Stream (TS) packet, comprising:
   a TS processing unit for processing the TS packet;
   an output buffer for buffering and outputting TS packets processed by the TS processing unit; and
   a bit rate adjustment unit for separating a counting value of packet output time based on a bit rate requested by the TS processing unit into an integer part and a decimal part using a preset reference cipher according to ticks, for storing the integer part and the decimal part, for generating TS packet output signals for outputting one TS packet stored in the output buffer if a value obtained by performing a first counting according to the ticks reaches a value of the integer part, for resetting a first count value, and for decreasing the first count value by one if a carry occurs in a value obtained by performing a second counting for achieving an increment by the value of the stored decimal part whenever the TS packet output signals are generated.

2. The apparatus as claimed in claim 1, wherein the bit rate adjustment unit includes programmable main tick and fraction registers, which respectively store the integer part and the decimal part separately from each other by the preset reference cipher according to the ticks, and main and fraction counters for performing the first and second counting, respectively.

3. The apparatus as claimed in claim 1, further comprising a user interface for receiving a desired bit rate from a user, and the TS processing unit requests the bit rate adjustment unit to adjust a bit rate according to the user requested bit rate input through the user interface.

4. The apparatus as claimed in claim 1, wherein the reference cipher includes usec.

5. The apparatus as claimed in claim 1, wherein the TS processing unit is an MPEG-2 TS processing unit.

6. A method for adjusting an output bit rate of a Transport Stream (TS) packet, the method comprising the steps of:
   separating a counting value of packet output time based on a requested bit rate into an integer part and a decimal part by a preset reference cipher according to ticks, and setting values of main tick and fraction registers;
   performing a counting operation for increasing a main counter by one every tick;
   if a count value of the main counter reaches the value of the main tick registers, outputting one TS packet, resetting the main counter, and then performing the counting operation again; and
   increasing the value of the fraction counter by a value stored in the fraction register whenever the packet is transmitted, and decreasing the value of the main counter by one if a carry occurs in the fraction counter due to overflow.

7. The method as claimed in claim 6, wherein the reference cipher includes usec.

* * * * *

UNITED STATES PATENT AND TRADEMARK OFFICE
CERTIFICATE OF CORRECTION

PATENT NO. : 7,623,470 B2
APPLICATION NO. : 11/593905
DATED : November 24, 2009
INVENTOR(S) : Kim et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 564 days.

Signed and Sealed this

Twenty-sixth Day of October, 2010

David J. Kappos
*Director of the United States Patent and Trademark Office*